Figure 1:
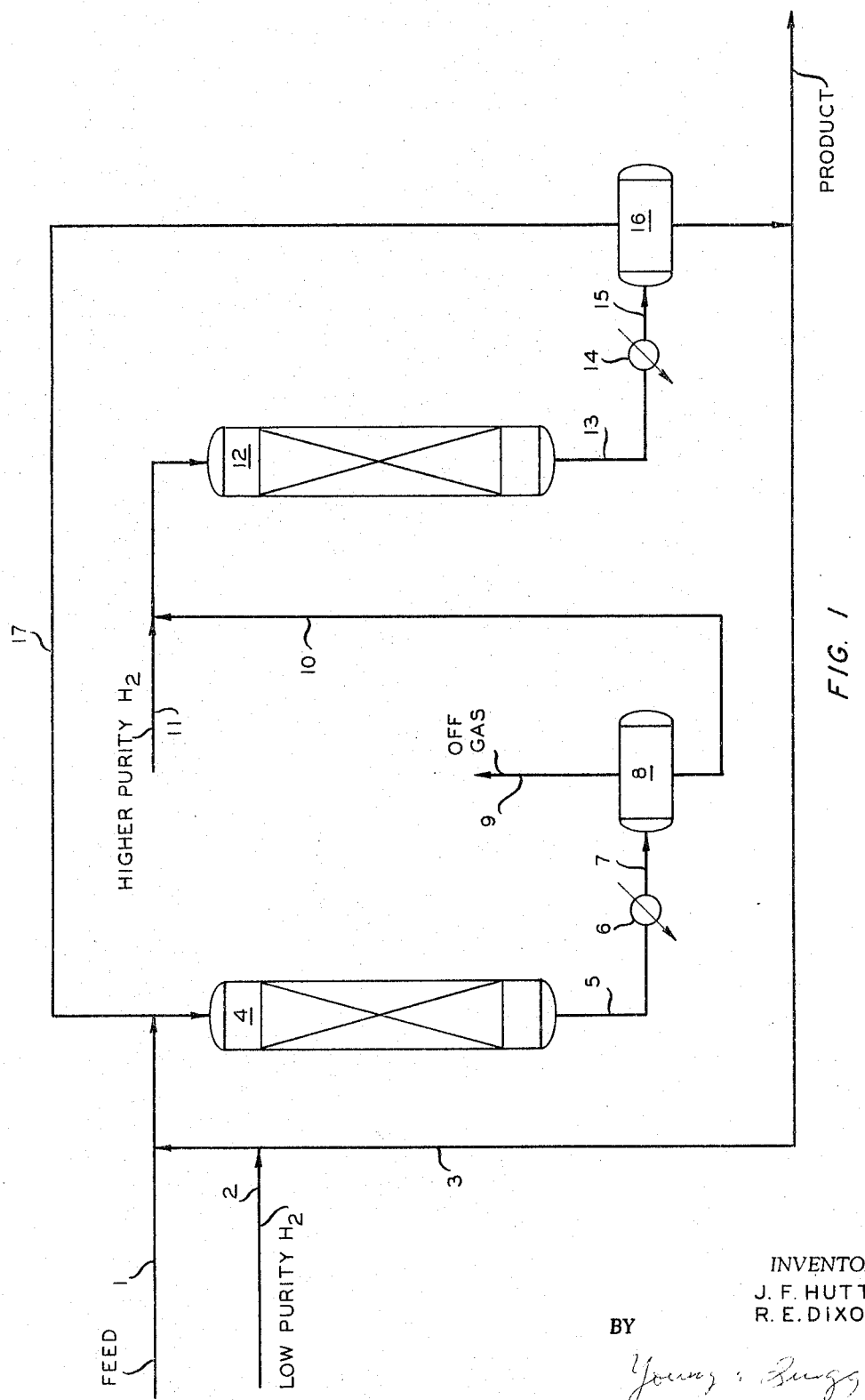

May 9, 1967 J. F. HUTTO ETAL 3,318,965
HYDROGENATION OF BENZENE TO CYCLOHEXANE
Filed Sept. 4, 1964 2 Sheets-Sheet 1

INVENTORS
J. F. HUTTO
R. E. DIXON
BY
Young & Quigg
ATTORNEYS

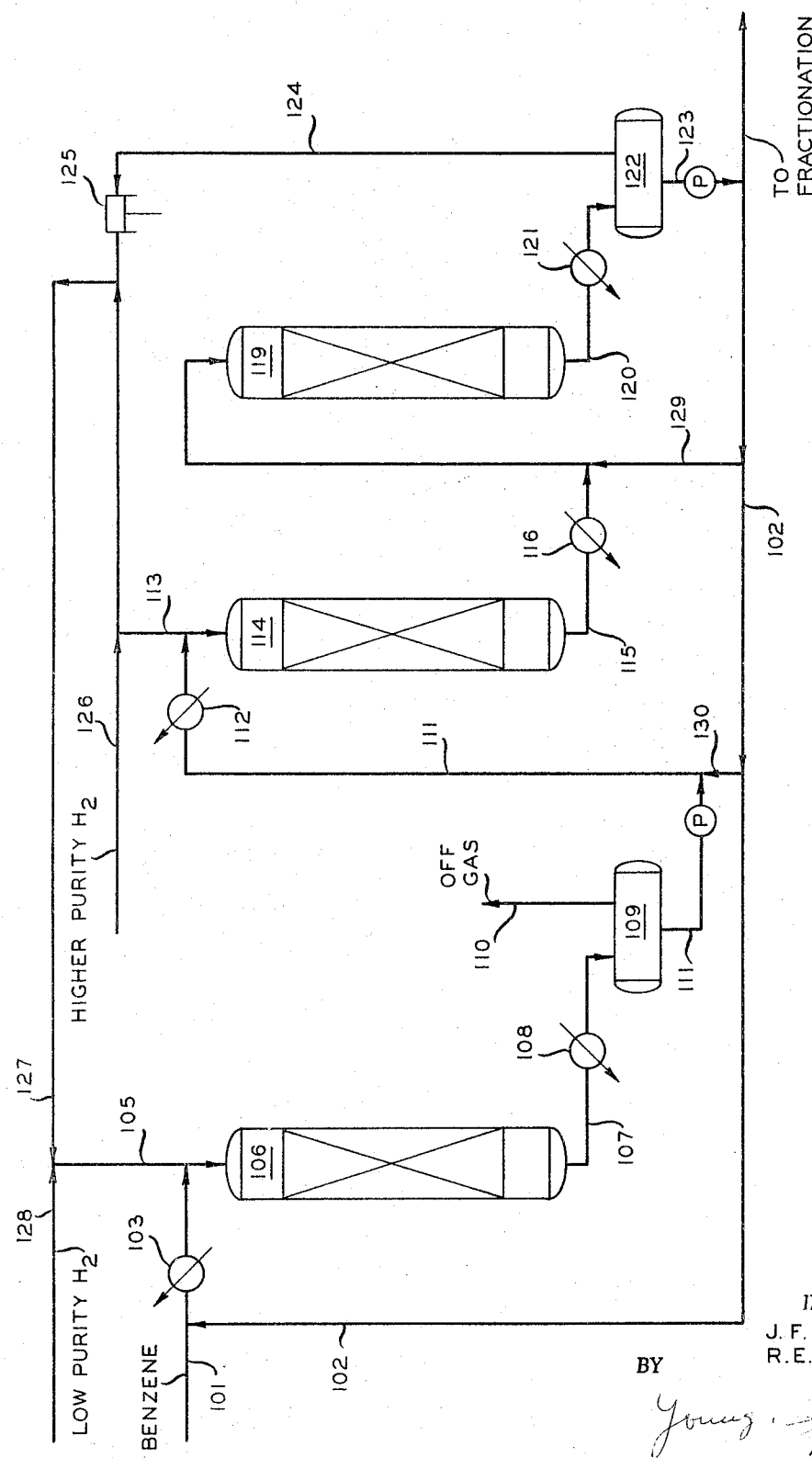

10

United States Patent Office 3,318,965
Patented May 9, 1967

3,318,965
HYDROGENATION OF BENZENE TO
CYCLOHEXANE
John F. Hutto and Rolland E. Dixon, Bartlesville, Okla., assignors to Phillips Petroleum Company, a corporation of Delaware
Filed Sept. 4, 1964, Ser. No. 394,484
4 Claims. (Cl. 260—667)

This invention relates to organic reactions. In one of its aspects this invention relates to the reaction of two organic reactants to produce an organic compound which comprises passing one compound with an excess of a second compound to a first reactor, reacting the compounds so that said first compound is completely used, admixing with the effluent from said first reactor an excess of said first reactant, passing said mixture to a second reactor, therein reacting said first and second compounds so as to use up all unreacted said second compound, separating from the effluent from said second reactor the unused first orgnic reactant and recycling said unused first reactant to be admixed with an excess of said second reactant. In another aspect of the invention, it relates to reacting a gas and a hydrocarbon to produce an organic compound, the process comprising admixing a low purity gas with the hydrocarbon, reacting the mixture so that all of the reactable gas in the low purity gas mixture is used up, separating the remaining gas from the product and unreacted hydrocarbon, mixing with the unreacted hydrocarbon and organic product a higher purity gas, passing the mixture to a second reactor wherein substantially all of the hydrocarbon is used up, separating the unreacted gas from the organic product and using that gas as the gaseous reactant for the admixture with the excess of hydrocarbon. In a still further aspect, the hydrocarbon is benzene, the gas is hydrogen, and the organic compound is cyclohexane.

Organic reactions are generally low yield reactions. Even under the most favorable conditions stoichiometric amounts of some reactants will remain after an organic process is carried out. In order to drive the process to completion, an excess of one reactant or the other must be added. We have now discovered that by using two reactors, adding an excess of one compound to the first reactor and adding an excess of the second compound to the second reactor, a substantially pure product will result with the complete reaction of the reactants.

It is, therefore, an object of this invention to provide a process for carrying out organic reactions in which a pure product results. It is a further object of this invention to provide an organic reaction in which all the reactants are used. It is a still further object of this invention to provide a process for hydrogenating benzene to cyclohexane. It is a further object of this invention to provide a process for hydrogenating benzene to cyclohexane using a low grade hydrogen stream. It is a still further object of this invention to provide an apparatus for the process of this invention.

Other, aspects, objects and the several advantages of this invention are apparent to one skilled in the art upon a study of the disclosure, the drawings, and the appended claims.

According to the invention, a continuous process is provided for reacting two reactants to produce an organic compound. In this process two reaction chambers are used. If the reactants are, for example, $a$ and $b$, an excess of reactant $a$ is mixed with a low purity concentration of reactant $b$ and the mixture is passed to a first reactor. In the first reactor substantially all of the reacant $b$ is used to form the organic product, there being an excess of reactant $a$. The impurities present in reactant $b$ can be removed from the effluent from the first reactor. Thereafter, a higher purity reactant $b$ is mixed in excess with the remaining effluent from the first reactor. The mixture is passed to a second reactor wherein substantially all of the reactant $a$ is used up. The unreacted reactant $b$ can be separated from the effluent from the second reactor and, being of low grade purity, can be used to admix with an excess of reactant $a$ in the first reactor.

Further, if $a$ and $b$ have widely differing boiling points, the impurities which boil below the range of $a$ can be removed from the effluent of the first reactor and before the high purity reactant $b$ is added. Further, the finished product can be used as a diluent in the first and second reactors.

In the preferred embodiment of the invention, the concept is applied to a hydrogenation process in which benzene is hydrogenated to cyclohexane. This embodiment is best understood by reference to the accompanying drawings.

FIGURE 1 is a schematic drawing of the invention as applied to a hydrogenation process in its simplest form.
FIGURE 2 is a more detailed hydrogenation operation.

Referring now to FIGURE 1, benzene is fed into the reaction through line 1. A low purity hydrogen stream is added through line 2, and a diluent is added through line 3. The mixture is passed to hydrogenation reactor 4, wherein a portion of the benzene is hydrogenated to cyclohexane or intermediate hydrogenation products of benzene. In this reactor, an excess of benzene is present and substantially all of the hydrogen in the low purity stream is used up. The effluent is removed from the reactor 4 though line 5, and is cooled in heat exchanger 6, and passes to a phase separator 8 through line 7. Gaseous impurities are removed through line 9 while the liquid comprising substantially cyclohexane and benzene is passed through line 10 to reactor 12. A higher purity hydrogen stream is admixed with the feed to reactor 12 through line 11 and the high purity gas stream enters the process through line 11. This stream of higher purity hydrogen should comprise at least 60 mol percent hydrogen, and preferably at least 70 mol percent. In reactor 12, an excess of hydrogen is present and substantially all of the benzene is hydrogenated to cyclohexane. The effluent from reactor 12 is cooled in heat exchanger 14 and is passed through lines 13 and 15 to phase separator 16. The liquid in phase separator 16 is substantially pure cyclohexane and the gas is a low purity hydrogen stream. The low purity stream can be removed from phase separator 16 through line 17 and recycled back to be admixed with the benzene feed 1. The cyclohexane removed from separator 16 can be passed to a fractionator for further processing or can be recycled back to be admixed with the incoming benzene feed 1 and thus be used as a diluent for the reaction process.

Referring now to FIGURE 2, benzene, introduced through line 101, is admixed with diluent cyclohexane through line 102. The mixture is heated in 103 and is dmixed with a low purity hydrogen stream which is itroduced through line 105. The mixture is passed to reactor wherein substantially all of the hydrogen present in the low purity hydrogen stream is reacted with enzene to produce cyclohexane. The effluent is passed rom reactor 106 through line 107 and is cooled in heat exchanger 108. After being cooled, the effluent is passed o phase separator 109, wherein gaseous impurities are emoved through line 110 and liquid comprising substantially benzene, intermediate hydrogenation products and yclohexane is removed through line 111. If necessary, nore diluent cyclohexane can be introduced through line 30. The mixture is heated in heat exchanger 112 and dmixed with a higher purity hydrogen stream 113. The nixture is passed to reactor 114 wherein hydrogenation akes place. The effluent from reactor 114, withdrawn hrough line 115, can be cooled through heat exchanger 16 and admixed with more cyclohexane to dilute the nixture further. The mixture is further passed to reactor 19, wherein the hydrogenation is completed. In reactors 14 and 119 substantially all of the benzene is converted o cyclohexane. The effluent from reactor 119 is passed hrough line 120, cooled in heat exchanger 121, and assed to phase separator 122. The liquid in phase separator 122 will comprise substantially cyclohexane, while he gas from said phase separator 122 comprises a low urity hydrogen stream which can be passed from line 24 through compressor 125 and, if necessary, admixed vith a higher purity hydrogen stream 126, passed through ine 127, admixed with a low purity hydrogen stream 128, ind passed through line 105 to be admixed with the fresh enzene. It can be seen from the drawing and the description that a low purity hydrogen stream can be used for he reaction process. The product can be further processed or passed through line 102 and used as diluents for he various reactors.

350° and 480 pounds per square inch. The effluent from reactor 119, comprising substantially cyclohexane and hydrogen, is cooled and is passed to phase separator 122, which operates at about 100° and 450 pounds per square inch. A material balance for this process is given in Table I.

TABLE I

| | Stream Name | | | | | | |
|---|---|---|---|---|---|---|---|
| | Fresh Benzene Feed | Low Purity Hydrogen | Liquid Recycle | Off-Gas To Fuel | Feed To Reactors II and III | Higher Purity Hydrogen | To Fractionation |
| Stream No. | 101 | 127 | 102 | 110 | 111 | 126 | 123 |
| Composition: | | | | | | | |
| Hydrogen | | 104.53 | 1.51 | | | 315.089 | 0.389 |
| Carbon Monoxide | | 2.677 | 0.26 | 2.937 | | 3.00 | 0.063 |
| Methane | | 79.97 | 36.03 | 116.00 | | 125.33 | 9.33 |
| Acetylene | | | Trace | Trace | | Trace | Trace |
| Ethylene | | 0.08 | 0.32 | 0.40 | | 0.484 | 0.084 |
| Ethane | | 0.122 | 0.25 | 0.372 | | 0.436 | 0.064 |
| Cyclohexane | | 5.14 | 404.63 | | | 445.12 | 104.9 |
| Benzene | 104.9 | | | | | 69.55 | |
| Total Mols/Hr | 104.9 | 192.519 | 443.00 | 119.709 | 514.67 | 444.339 | 114.830 |

*Example*

104.9 mols per hour of benzene are introduced through ine 101 and admixed with 443 mols per hour of liquid ecycle through line 102. The mixture is heated and admixed with 192 mols per hour of low purity hydrogen hrough line 127. The mixture is reacted in reactor 106 it about 350° and 470 p.s.i. The effluent from reactor 106 is cooled to about 100° F. and about 119 mols of off-gas are taken from the liquid gas separator 109 through ine 110. About 514 mols of feed containing cyclohexane and benzene are passed through heater 112 and nto reactor 114. About 444 mols per hour of higher urity hydrogen are added through line 126, a portion assing through line 113. The reaction in reactor 114 is arried out at about 350° and 500 pounds per square nch. The effluent from reactor 114 is passed to reactor 119, and the reaction in reactor 119 takes place at about Reasonable variation and modifications are possible within the scope of the foregoing disclosure, drawings, and the appended claims to the invention, the essence of which is that a continuous organic reaction is carried out in two reactors, the method comprising passing an excess of a first reactant admixed with an impure quantity of a second reactant to a reactor wherein substantially all of the second reactant is used in the reaction, separating impurities from the effluent from the reaction, adding an excess of said second reactant, passing the mixture to a second reactor, therein reacting under such conditions that substantially all of the first reactant is used and an excess of said second reactant remains, separating the remainder of the second reactant from the product and recycling the remainder of said second reactant to be admixed with an excess of said first reactant.

We claim:

1. In a process for the hydrogenation of an unsaturated hydrocarbon with hydrogen wherein a gas stream containing hydrogen is admixed with said hydrocarbon, the mixture is passed to a first reaction zone wherein at least partial hydrogenation takes place, the effluent from said first reaction zone is admixed with a second hydrogen stream and passed to a second reaction zone wherein further hydrogenation takes place, the effluent from said second reaction zone is cooled and gaseous products containing hydrogen are separated from liquid products, the improvement which comprises: cooling the effluent from said first reaction zone and separating gaseous products from liquid products, recycling said gaseous products containing hydrogen separated from said liquid products from said second reaction zone effluent and providing an excess of said unsaturated hydrocarbons in said first reaction zone so that substantially all of said hydrogen is used by said process.

2. A process according to claim 1 wherein said unsaturated hydrocarbon is benzene and cyclohexane is produced by said process.

3. A process according to claim 2 wherein a portion of the cyclohexane produced is recycled and admixed with the benzene and gas in said first reaction zone.

4. A process according to claim 1 wherein there is further provided a third reaction zone and said effluent from said second reaction zone is cooled, mixed with liquid product as a diluent and passed to said third reaction zone wherein further hydrogenation takes place before separation of gaseous products from liquid products.

(References on following page)

References Cited by the Examiner

UNITED STATES PATENTS

| | | | |
|---|---|---|---|
| 2,671,754 | 3/1954 | De Rosset et al. | 208—89 |
| 2,872,492 | 2/1959 | Donaldson et al. | 260—667 |
| 3,054,833 | 9/1962 | Donaldson et al. | 260—667 |
| 3,146,187 | 8/1964 | Cabbage | 260—667 |
| 3,147,210 | 9/1964 | Hass et al. | 260—667 |
| 3,227,768 | 1/1966 | Cole et al. | 260—667 |
| 3,228,858 | 1/1966 | Matyear | 260—667 |

DELBERT E. GANTZ, *Primary Examiner.*

S. P. JONES, *Assistant Examiner.*